| United States Patent [19] | [11] | 4,316,819 |
|---|---|---|
| Tu et al. | [45] | Feb. 23, 1982 |

[54] TECHNIQUE TO REDUCE THE ZEOLITE MOLECULAR SIEVE SOLUBILITY IN AN AQUEOUS SYSTEM

[75] Inventors: Hosheng Tu, Shorewood; Stephen W. Sohn, Northbrook, both of Ill.

[73] Assignee: UOP Inc., Des Plaines, Ill.

[21] Appl. No.: 136,022

[22] Filed: Aug. 11, 1980

[51] Int. Cl.$^3$ .......................... B01J 20/18; B01J 20/22
[52] U.S. Cl. ................................. 252/430; 252/455 Z
[58] Field of Search ................. 127/46 R, 46 A, 46 B; 210/673, 679, 691; 252/455 Z, 430; 264/15; 423/328

[56] References Cited

U.S. PATENT DOCUMENTS

| 3,615,187 | 10/1971 | Suzukawa et al. | 264/15 |
| 4,140,773 | 2/1979 | Stowell et al. | 264/15 |
| 4,230,593 | 10/1980 | Wagner et al. | 252/455 Z |
| 4,248,737 | 2/1981 | Kulprathipanja | 252/455 Z |

OTHER PUBLICATIONS

Woodruff, C. W. et al., "Effect of Processing Variables on Particles Obtained by Extrusion-Spheronization Processing", Journal of Pharmaceutical Sciences, vol. 61, No. 5, May 1972, pp. 787-790.

*Primary Examiner*—Ivars C. Cintins
*Attorney, Agent, or Firm*—James R. Hoatson, Jr.; Louis A. Morris; William H. Page, II

[57] ABSTRACT

An improvement to an adsorbent comprising a crystalline aluminosilicate used in a process for separating a component from a feed mixture comprising an aqueous solution of a mixture of different components, such as a mixture of saccharides. There is an undesirable tendency for the silicon constituent of the crystalline aluminosilicate to dissolve in the aqueous system. The adsorbent has incorporated in it a binder material comprising a water permeable organic polymer which substantially reduces the undesirable dissolution. The adsorbent is manufactured by mixing together powder of the crystalline aluminosilicate, powders of the organic polymer binder, and a liquid organic solvent, forming the mixture into discrete formations, preferably by extruding the mixture into an extrudate, and drying the formations. The improvement comprises spheronizing those formations prior to drying them.

7 Claims, No Drawings

4,316,819

TECHNIQUE TO REDUCE THE ZEOLITE MOLECULAR SIEVE SOLUBILITY IN AN AQUEOUS SYSTEM

BACKGROUND OF THE INVENTION

1. Field of the Invention

The field of art to which this invention pertains is solid-bed adsorptive separation. More specifically, the invention relates to an improvement to an adsorbent, and an improved process for separating a component from a mixture comprising an aqueous solution of a mixture of different components which process employs an adsorbent comprising a crystalline aluminosilicate which selectively adsorbs a component from the feed mixture.

2. Prior Art

It is known in the separation art that certain crystalline aluminosilicates referred to as zeolites can be used in the separation of a component from an aqueous solution of a mixture of different components. For example, adsorbents comprising crystalline aluminosilicate are used in the method described in U.S. Pat. No. 4,014,711 to separate fructose from a mixture of sugars in aqueous solution including fructose and glucose.

It is also known that crystalline aluminosilicates or zeolites are used in adsorption processing in the form of agglomerates having high physical strength and attrition resistance. Methods for forming the crystalline powders into such agglomerates include the addition of an inorganic binder, generally a clay comprising silicon dioxide and aluminum oxide to the high purity zeolite powder in wet mixture. The blended clay zeolite mixture is extruded into cylindrical type pellets or formed into beads which are subsequently calcined in order to convert the clay to an amorphous binder of considerable mechanical strength. As binders, clays of the kaolin type are generally used.

Zeolite crystal and inorganic binder agglomerates have long been known to have the property of gradually disintegrating as a result of continuous contact with water. This disintegration has been observed as a silicon presence or contamination in the solution in contact with the adsorbent. Such contamination may at times be sufficiently severe to impart a cloudy appearance to the solution.

It has been discovered that the disintegration of the adsorbent may be minimized by substituting a water permeable organic polymer for the inorganic binder material. The adsorbent is made by mixing together a powder of the zeolite crystal, a powder of the polymer and a liquid organic solvent to form a malleable mixture. The mixture is then formed into discrete formations and dried.

We have discovered an improvement to an adsorbent having a water permeable organic polymer binder which enables even further reduction of its extent of disintegration in aqueous service.

SUMMARY OF THE INVENTION

Accordingly, the objectives of our invention are (1) to develop an improved adsorbent composition suitable for use in a process for the separation of a component from a feed mixture comprising different components in aqueous solution by contacting the mixture with an improved adsorbent comprising a crystalline aluminosilicate so as to minimize the dissolution of the crystalline aluminosilicate and silica contamination of the product.

In brief summary, our invention is, in one embodiment, an adsorbent comprising a crystalline aluminosilicate suitable for use in a process for the separation of a component from a feed mixture comprising an aqueous solution of a mixture of components by contacting the solution with the adsorbent. The silicon constituent of the adsorbent tends to dissolve in the solution resulting in the undesirable disintegration of the crystalline aluminosilicate. The adsorbent is bound by a binder material comprising a water permeable organic polymer which incorporation substantially reduces the extent of dissolution of the silicon constituent and the extent of the disintegration of the adsorbent. The method of manufacture of the adsorbent comprises: (a) mixing together a powder of crystalline aluminosilicate, a powder of the binder and a liquid organic solvent to form a malleable mixture; (b) forming the malleable mixture into discrete formations; (c) removing the solvent from the formations to obtain hard dry formations; and (d) breaking the hard dry formations into particles of desired sizes. The improvement to the process comprises spheronizing the formations of step (b) prior to proceeding to step (c), thereby achieving further reduction of the extent of dissolution of the silicon constitutent and the extent of the disintegration of the adsorbent.

In another embodiment, our invention is an adsorbent for use in a process for the separation of a compound from a feed mixture comprising an aqueous solution of a mixture of components by contacting the solution with the adsorbent of the first mentioned embodiment.

Other objects and embodiments of our invention encompass details about feed mixtures, adsorbents, binder materials, solvents, desorbent materials and operating conditions, all of which are hereinafter disclosed in the following discussions of each of the facets of the present invention.

DESCRIPTION OF THE INVENTION

At the outset the definitions of various terms used throughout the sepecification will be useful in making clear the operation, objects and advantages of the process.

A feed mixture is a mixture containing one or more extract components and one or more raffinate components to be separated by our process. The term "feed stream" indicates a stream of a feed mixture which passes to the adsorbent used in the process.

An "extract component" is a component that is more selectively adsorbed by the adsorbent while a "raffinate component" is a component that is less selectively adsorbed. The term "desorbent material" shall mean generally a material capable of desorbing an extract component. The term "desorbent stream" or "desorbent input stream" indicates the stream through which desorbent material passes to the desorbent. The term "raffinate stream" or "raffinate output stream" means a stream through which a raffinate component is removed from the absorbent. The composition of the raffinate stream can vary from essentially 100% desorbent material to essentially 100% raffinate components. The term "extract stream" or "extract output stream" shall mean a stream through which an extract material which has been desorbed by a desorbent material is removed from the adsorbent. The composition of the extract stream, likewise, can vary from essentially 100% desorbent material to essentially 100% extract components. At least a portion of the extract stream, and preferably at least a portion of the raffinate stream, from the separation process are passed to separation means, typically fractionators or evaporators, where at least a portion of desorbent material is separated to produce an extract product and a raffinate product. The terms "extract product" and "raffinate product" mean products produced by the process containing, respectively, an extract component and a raffinate component in higher concentrations than those found in the extract stream and the raffinate stream.

The term "selective pore volume" of the adsorbent is defined as the volume of the adsorbent which selectively adsorbs an extract component from the feed mixture. The term "non-selective void volume" of the adsorbent is the volume of the adsorbent which does not selectively retain an extract component from the feed mixture. This volume includes the cavities of the absorbent which contain no adsorptive sites and the interstitial void spaces between adsorbent particles. The selective pore volume and the non-selective void volume are generally expressed in volumetric quantities and are of importance in determining the proper flow rates of fluid required to be passed into an operational zone for efficient operations to take place for a given quantity of adsorbent. When adsorbent "passes" into an operational zone (hereinafter defined and described) employed in one embodiment of this process, its non-selective void volume, together with its selective pore volume, carries fluid into that zone. The non-selective void volume is utilized in determining the amount of fluid which should pass into the same zone in a counter-current direction to the absorbent to displace the fluid present in the non-selective void volume. If the fluid flow rate passing into a zone is smaller than the non-selective void volume rate of adsorbent material passing into that zone, there is a net entrainment of liquid into the zone by the adsorbent. Since this net entrainment is a fluid present in non-selective void volume of the adsorbent, it, in most instances, comprises less selectively retained feed components. The selective pore volume of an adsorbent can in certain instances adsorb portions of raffinate material from the fluid surrounding the adsorbent, since in certain instances there is competition between extract material and raffinate material for adsorptive sites within the selective pore volume. If a large quantity of raffinate material with respect to extract material surrounds the adsorbent, raffinate material can be competitive enough to be adsorbed by the adsorbent.

The so-called "simple sugars" are classified as monosaccharides and are those sugars which upon hydrolysis do not break down into smaller simpler sugars. One may further classify monosaccharides as aldoses or ketoses, depending upon whether they are hydroxy aldehydes or hydroxy ketones, and by the number of carbon atoms in the molecule. Most common and well known are probably the hexoses. Common ketohexoses are fructose (levulose) and sorbose; common aldohexoses are glucose (dextrose), mannose and galactose. The term "oligosaccharides", as commonly understood in the art and as used herein, means simple polysaccharides containing a known number of constituent monosaccharide units. An oligosaccharide that breaks up upon hydrolysis into two monosaccharide units is called a disaccharide, examples being sucrose, maltose, and lactose. Those giving three such units are trisaccharides, of which raffinose and melezitose are examples. Di-, tri- and tetrasaccharides comprise practically all of the oligosaccharides. The term "polysaccharide" includes oligosaccharides but usually it refers to carbohydrate materials of such high molecular weight, namely, those that are capable of breaking up on hydrolysis into a large number of monosaccharide units. Typical polysaccharides are starch, glycogen, cellulose and pentosans.

Feed mixtures which can be charged to the process of the invention may, for example, be aqueous solutions of one or more aldoses and one or more ketoses, or one or more monosaccharides and one or more oligosaccharides. The concentration of solids in the solutions may range from about 0.5 wt. % to about 50 wt. % or more, but preferably will be from about 5 to about 35 wt. %. Starch syrups such as corn syrup are examples of feed mixtures which can be charged to the process. Such syrups are produced by the partial hydrolysis of starch generally in the presence of mineral acids or enzymes. Corn syrup produced in this manner will typically contain 25 to 75 wt. % solids comprising 90 to 95% glucose and 5 to 10% maltose and higher oligosaccharides. A portion of the glucose in this corn syrup may be isomerized with an isomerizing enzyme to produce a high-fructose corn syrup, typically comprising 40-45% fructose, 50-55 % glucose and 5-10% oligosaccharides, which can also be charged to the process. The pH of the aqueous solution comprising the feed mixture may be from about 5.0 to about 8.0.

Desorbent materials used in various prior art adsorptive separation processes vary depending upon such factors as the type of operation employed. In the swing-bed system, in which the selectively adsorbed feed component is removed from the adsorbent by a purge stream, desorbent selection is not as critical and desorbent material comprising gaseous hydrocarbons such as methane, ethane, etc., or other types of gases such as nitrogen or hydrogen, may be used at elevated temperatures or reduced pressures or both to effectively purge the adsorbed feed component from the adsorbent. However, in adsorptive separation processes which are generally operated continuously at substantially constant pressures and temperatures to insure liquid phase, the desorbent material must be judiciously selected to satisfy many criteria. First, the desorbent material should displace an extract component from the adsorbent with reasonable mass flow rates without itself being so strongly adsorbed as to unduly prevent an extract component from displacing the desorbent material in a following adsorption cycle. Expressed in terms of the selectivity (hereinafter discussed in more detail), it is preferred that the adsorbent be more selective for all of the extent components with respect to a raffinate component than it is for the desorbent material with respect to a raffinate component. Secondly, desorbent materials must be compatible with the particular adsorbent and the particular feed mixture. More specifically, they must not reduce or destroy the critical selectivity of the adsorbent for an extract component with respect to a raffinate component. Additionally, desorbent materials should not chemically react with or cause a chemical reaction of either an extract component or a raffinate component. Both the extract stream and the raffinate stream are typically removed from the adsorbent in admixture with desorbent material and any chemical reaction involving a desorbent material and an extract component or a raffinate component would reduce the purity of the extract product or the raffinate product or both. Since both the raffinate stream and the extract stream typically contain desorbent materials, desorbent materials should additionally be substances which are easily separable from the feed mixture that is passed into the process. Without a method of separating at least a portion of the desorbent material present in the extract stream and the raffinate stream, the concentration of an extract component in the extract product and the concentration of a raffinate component in the raffinate product would not be very high, nor would the desorbent material be available for reuse in the process. It is contemplated that at least a portion of the desorbent material will be separated from the extract and the raffinate streams by distillation or evaporation, but other separation method such as reverse osmosis may also be employed alone or in combination with distillation or evaporation. Since the raffinate and extract products are foodstuffs intended for human consumption, desorbent materials should also be non-toxic. Finally, desorbent materials should also be materials which are readily available and therefore reasonable in cost.

Water having a pH of from about 5.0 to about 8.0 satisfies these criteria and is a suitable and preferred desorbent material for the process. The pH of the desorbent material is important because adsorption of a component by the adsorption, removal of a raffinate stream, desorption of the component from the adsorbent and removal of an extract stream all typically occur in the presence of desorbent material. If the desorbent material is too acidic or too alkaline, chemical reactions of the components are promoted and reaction products are produced that can reduce the yield purity of either the extract or raffinate product, or both.

Water pH does of course vary widely depending upon the source of the water in addition to other factors. Methods of maintaining and controlling a desired water pH are, however, well known to those skilled in the art of water treating. Such methods generally comprise adding an alkaline compound such as sodium hydroxide or an acid compound such as hydrochloric acid to the water in amounts as necessary to achieve and maintain the desired pH.

The prior art has recognized that certain characteristics of adsorbents are highly desirable, if not absolutely necessary, to the successful operation of a selective adsorption process. Such characteristics are generally important to this process. Among such characteristics are: adsorptive capacity for some volume of an extract component per volume of adsorbent; the selective adsorption of an extract component with respect to a raffinate component and the desorbent material; and sufficiently fast rates of adsorption and desorption of an extract component to and from the adsorbent. Capacity of the adsorbent for adsorbing a specific volume of an extract component is, of course, a necessity; without such capacity the absorbent is useless for adsorptive separation. Furthermore, the higher the adsorbent's capacity for an extract component the better is the adsorbent. Increased capacity of a particular adsorbent makes it possible to reduce the amount of adsorbent needed to separate an extract component of known concentration contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life. The second necessary adsorbent characteristic is the ability of the adsorbent to separate components of the feed; or, in other words, that the absorbent posses adsorptive selectivity (B), for one component as compared to another component. Relative selectivity can be expressed not only for one feed component as compared to another but can also be expressed between any feed mixture component and the desorbent material. The selectivity, (B) as used throughout this specification is defined as the ratio of the two components of the adsorbed phase over the ratio of the same two components in the unadsorbed phase at equilibrium conditions. Relative selectivity is shown as Equation 1 below:

$$\text{Selectivity} = (B) = \frac{\text{vol. percent } C/\text{vol. percent } D_A}{\text{vol. percent } C/\text{vol. percent } D_U} \quad \text{Equation 1}$$

where C and D are two components of the feed represented in volume percent and the subscripts A and U represent the adsorbed and unadsorbed phases respectively. The equilibrium conditions were determined when the feed passing over a bed of adsorbent did not change composition after contacting the bed of adsorbent. In other words, there was no net transfer of material occurring between the unadsorbed and adsorbed phases. Where selectivity of two components approaches 1.0 there is no preferential adsorption of one component by the adsorbent with respect to the other; they are both adsorbed (or non-adsorbed) to about the same degree with respect to each other. As the (B) becomes less than or greater than 1.0 there is a preferential adsorption by the adsorbent for one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Ideally, desorbent materials should have a selectivity equal to about 1 or slightly less than 1 with respect to all extract components so that all of the extract components can be desorbed as a class with reasonable flow rates of desorbent material and so that extract components can displace desorbent material in a subsequent adsorption step. While separation of an extract component from a raffinate component is theoretically possible when the selectivity of the adsorbent for the extract component with respect to the raffinate component is greater than 1.0, it is preferred that such selectivity be greater than 1.0. Like relative volatility, the higher the selectivity the easier the separation is to perform. Higher selectivities permit a smaller amount of adsorbent to be used. The third important characteristic is the rate of exchange of the extract component of the feed mixture material or, in other words, the relative rate of desorption of the extract component. This characteristic relates directly to the amount of desorbent material that must be employed in the process to recover the extract component from the adsorbent; faster rates of exchange reduce the amount of desorbent material needed to remove the extract component and therefore permit a reduction in the operating cost of the process. With faster rates of exchange, less desorbent material has to be pumped through the process and separated from the extract stream for reuse in the process.

Adsorbents to be used in the process of this invention will comprise specific crystalline aluminosilicates or molecular sieves. Particular crystalline aluminosilicates encompassed by the present invention include crystalline aluminosilicate cage structures in which the alumina and silica tetrahedra are intimately connected in an open three dimensional network to form cage-like structures with window-like pores of about 8 Å free diameter. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions and thus the crystalline aluminosilicates are often referred to as "molecular sieves", particularly when the separation which they effect is dependent essentially upon differences between the sizes of the feed molecules as, for instance, when smaller normal paraffin molecules are separated from larger isoparafin molecules by using a particular molecular sieve.

In hydrated form, the crystalline aluminosilicates used in the process of this invention generally encompass those zeolites represented by the Formula 1 below:

$$M_{2/n}O:Al_2O_3:wSiO_2:yH_2O \qquad \text{Formula 1}$$

where "M" is a cation which balances the electrovalence of the aluminum-centered tetrahedra and which is generally referred to as an exchangeable cationic site, "n" represents the valence of the cation, "w" represents the moles of SiO$_2$, and "y" represents the moles of water. The generalized cation "M" may be monovalent, divalent or trivalent or mixtures thereof.

The prior art has generally recognized that adsorbents comprising X and Y zeolites can be used in certain adsorptive separation processes. These zeolites are described and defined in U.S. Pat. Nos. 2,882,244 and 3,120,007 respectively incorporated herein by reference thereto. The X zeolite in the hydrated or partially hydrated form can be represented in terms of mole oxides as shown in Formula 2 below:

$$(0.9 \pm 0.2)M_{2/n}O:Al_2O_3:(2.50 \pm 0.5)SiO_2:yH_2O \qquad \text{Formula 2}$$

where "M" represents at least one cation having a valence of not more than 3, "n" represents the valence of "M", and "y" is a value up to about 9 depending upon the identity of "M" and the degree of hydration of the crystal. As noted from Formula 2, the SiO$_2$/Al$_2$O$_3$ mole ratio of X zeolite is 2.5±0.5. The cation "M" may be one or more of a number of cations such as a hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium and the zeolite is therefore referred to as a sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 below:

$$(0.9 \pm 0.2)M_{2/n}O:Al_2O_3:wSiO_2:yH_2O \qquad \text{Formula 3}$$

where "M" is at least one cation having a valence not more than 3, "n" represents the valence of "M", "w" is a value greater than about 3 up to about 6, and "y" is a value up to about 9 depending upon the identity of "M" and the degree of hydration of the crystal. The SiO$_2$/Al$_2$O$_3$ mole ratio for Y zeolites can thus be from about 3 to about 6. Like the X zeolite, the cation "M" may be one or more of a variety of cations but, as the Y zeolite is initially prepared, the cation "M" is also usually predominately sodium. A Y zeolite containing predominately sodium cations at the exchangeable cationic sites is therefore referred to as a sodium-Y zeolite.

Cations occupying exchangeable cationic sites in the zeolite may be replaced with other cations by ion exchange methods well known to those having ordinary skill in the field of crystalline aluminosilicates. Such methods are generally performed by contacting the zeolite or an adsorbent material containing the zeolite with an aqueous solution of the soluble salt of the cation or cations desired to be placed upon the zeolite. After the desired degree of exchange takes place, the sieves are removed from the aqueous solution, washed, and dried to a desired water content. By such methods the sodium cations and any non-sodium cations which might be occupying exchangeable sites as impurities in a sodium-X or sodium-Y zeolite can be partially or essentially completely replaced with other cations. It is preferred that the zeolite used in the process of this invention contain cations at exchangeable cationic sites selected from the group consisting of the alkali metals and the alkaline earth metals.

Typically, adsorbents known to the prior are used in separative processes contain zeolite crystals and amorphous material. The zeolite will typically be present in the adsorbent in amounts ranging from about 75 wt. % to about 98 wt. % based on volatile free composition. Volatile free compositions are generally determined after the adsorbent has been calcined at 900° C. in order to drive off all volatile matter. The remainder of the adsorbent will generally be an amorphous inorganic material such as silica, or silica-alumina mixtures or compounds, such as clays, which material is present in intimate mixture with the small particles of the zeolite material. This amorphous material may be an adjunct of the manufacturing process of zeolite (for example, intentionally incomplete purification of either zeolite during its manufacture) or it may be added to relatively pure zeolite, but in either case its usual purpose is as a binder to aid in forming or agglomerating the hard crystalline particles of the zeolite. Normally, the adsorbent will be in the form of particles such as extrudates, aggregates, tablets, macrospheres or granules having a desired particle size range. The typical adsorbent will have a particle size range of about 16-50 mesh (Standard U.S. Mesh). Examples of zeolites used in adsorbents known to the art, either as is or after cation exchange, are "Molecular Sieves 13X" and "SK-40" both of which are available from the Linde Company, Tonawanda, N.Y. The first material of course contains X zeolite while the latter material contains Y zeolite. It is known that X or Y zeolites possess the selectivity requirement and other necessary requirements previously discussed and are therefore suitable for use in separation processes.

The adsorbent of our invention has incorporated therein a binder material comprising a water permeable organic polymer. To be water permeable, the organic polymer, when a dry solid, will have throughout its mass small void spaces and channels which will allow an aqueous solution to penetrate the polymer and thereby come into contact with the zeolite particles bound by the polymer. Cellulose nitrate and/or cellulose esters such as cellulose acetate have been found to be particularly suitable for use in the adsorbent of our invention. The preferred concentration of the organic polymer in the adsorbent is from about 3.0 to about 50.0 wt. %.

The adsorbent of our invention is in the form of particles having a particle size range of about 16–80 mesh (Standard U.S. Mesh). Adsorbents having an organic polymer binder do not require calcining, and, most important, achieve substantially reduced disintegration and silicon contamination of the product stream when used in an aqueous system. The reduced disintegration results in minimization of the undesirable increase in pressure drop through the column in which the adsorbent is packed as compared to the inevitable high increase associated with the adsorbents of the known art.

The adsorbent with an organic polymer binder is manufactured by mixing together powder of the crystalline aluminosilicate, powder of the organic polymer binder, and a liquid organic solvent to make the mixture malleable, forming the mixture into discrete formations, removing the solvent from the formations and breaking the formations into the desired sized particles. The forming of the malleable mixture is preferably done by extrusion. The aluminosilicate and binder powders may first be mixed together and the solvent added to the powder mixture, or the binder powder may be first dissolved in the solvent and the aluminosilicate powder added to the solution. Preferred liquid organic solvents are p-dioxane, methylethyl ketone, acetone, chloroform, benzyl alcohol, ethyl acetate and cyclohexanone, any of which may be mixed with formamide. The solvent is removed from the formations either by water washing followed by drying at a temperature not exceeding about 100° C., or by just drying at that temperature. The formations are broken into particles having a preferred size such that the particles will pass through a No. 16 screen and be retained on a No. 80 screen. Any fines resulting from the breaking of the particles not retained on a No. 80 screen may be added to the aluminosilicate-solvent-binder mixture. The particles may be further treated to effect ion exchange between cations at exchangeable cationic sites on the crystalline aluminosilicate in the particles and cations preferably selected from the group consisting of alkali metals and alkali earth metals.

The improvement to the organic polymer bound adsorbent comprising our invention is effected by the spheronization of the malleable discrete adsorbent formations obtained in the course of the adsorbent manufacture prior to removing the solvent from the formations. Spheronization is accomplished by feeding the adsorbent formations, preferably extrudates, into a special machine which imparts a rolling motion to the formations through action of a horizontal spinning plate in a stationary cylinder. In the first stages of spheronization, the formations are broken into pieces and as rolling progresses, the pieces are shaped into spherical particles. The time required to accomplish this shaping may vary from less than 30 seconds to several minutes depending on the degree of malleability of the material.

The particular machine heretofore used by us for spheronization is known by the trade name "Marumerizer" and is sold by Elanco Products Company, a division of Eli Lilly and Company. Material is fed onto the spinning plate of the Marumerizer and after the spheres are formed, they are discharged through an opening in the side of the stationary cylinder. The plate is belt-driven through a variable speed drive which can be set to select plate speeds of approximately 400 to 1,600 RPM.

The Marumerizer has long been used in the pharmaceutical industry for making spherical pelleted products having the advantages of attractive appearance, free flowing characteristics and the ability to be easily mixed when combination products are desired. We have found that spheronization as achieved by the Marumerizer and as claimed in our invention enables further reductions of silica loss of the organic polymer bound adsorbents used in aqueous service. We have observed that spheronization yields a denser adsorbent, which would enable the loading of adsorbent chambers in less time and the design of smaller chambers, and have also observed that spheronization in fact produces a better performing adsorbent from the standpoint of increased retention volume and decreased tendency to disintegrate. Without being limited to any particular theory, we believe the spheronization action forces the organic polymer into the macropore structure of the zeolite and to branch out and form a three dimensional matrix, thus accounting for the increased strength.

The adsorbent may be employed in the form of a dense compact fixed bed which is alternatively contacted with the feed mixture and desorbent materials. In the simplest embodiment of the invention, the adsorbent is employed in the form of a single static bed in which case the process is only semi-continuous. In another embodiment, a set of two or more static beds may be employed in fixed-bed contacting with appropriate valving so that the feed mixture is passed through one or more adsorbent beds while the desorbent materials can be passed through one or more of the other beds in the set. The flow of feed mixture and desorbent materials may be either up or down through the desorbent. Any of the conventional apparatus employed in static bed fluid-solid contacting may be used.

Counter-current moving-bed or simulated moving-bed counter-current flow systems, however, have a much greater separation efficiency than fixed adsorbent bed systems and are therefore preferred for use in the separation process. In the moving-bed or simulated moving-bed processes the adsorption and desorption operations are continuously taking place which allows both continuous production of an extract and a raffinate stream and the continual use of feed and desorbent streams. One preferred embodiment of this process utilizes what is known in the art as the simulated moving-bed counter-current flow system. The operating principles and sequence of such a flow system are described in U.S. Pat. No. 2,985,589 incorporated herein by reference thereto. In such a system, it is the progressive movement of multiple liquid access points down an adsorbent chamber that simulates the upward movement of adsorbent contained in the chamber. Only four of the access lines are active at any one time; the feed input stream, desorbent inlet stream, raffinate outlet stream, and extract outlet stream access lines. Coincident with this simulated upward movement of the solid adsorbent is the movement of the liquid occupying the void volume of the packed bed of adsorbent. So that counter-current contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates.

The active liquid access points effectively divided the adsorbent chamber into separate zones, each of which has a different function. In this embodiment of my process, it is generally necessary that three separate operational zones be present in order for the process to take place although in some instances an optional fourth zone may be used.

The adsorption zone, zone 1, is defined as the adsorbent located between the feed inlet stream and the raffinate outlet stream. In this zone, the feed stock contacts the adsorbent, an extract component is adsorbed, and a raffinate stream is withdrawn. Since the general flow through zone 1 is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in zone 1 is the purification zone, zone 2. The purification zone is defined as the adsorbent between the extract outlet stream and the feed inlet stream. The basic operations taking place in zone 2 are the displacement from the non-selective void volume of the adsorbent of any raffinate material carried into zone 2 by the shifting of adsorbent into this zone and the desorption of any raffinate material adsorbed within the selective pore volume of the adsorbent or adsorbed on the surfaces of the adsorbent particles. Purification is achieved by passing a portion of extract stream material leaving zone 3 into zone 2 at zone 2's upstream boundary, the extract outlet stream, to effect the displacement of raffinate material. The flow of material in zone 2 is in a downstream direction from the extract outlet stream to the feed inlet stream.

Immediately upstream of zone 2 with respect to the fluid flowing in zone 2 is the desorption zone or zone 3. The desorption zone is defined as the adsorbent between the desorbent inlet and the extract outlet stream. The function of the desorption zone is to allow a desorbent material which passes into this zone to displace the extract component which was adsorbed upon the adsorbent during a previous contact with feed in zone 1 in a prior cycle of operation. The flow of fluid in zone 3 is essentially in the same direction as that of zones 1 and 2.

In some instances, an optional buffer zone, zone 4, may be utilized. This zone, defined as the adsorbent between the raffinate outlet stream and the desorbent inlet stream, if used, is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone out of that zone into the desorption zone. Zone 4 will contain enough adsorbent so that raffinate material present in the raffinate stream passing out of that zone into the desorption zone. Zone 4 will contain enough adsorbent so that raffinate material present in the raffinate stream passing out of zone 1 and into zone 4 can be prevented from passing into zone 3, thereby contaminating extract stream removed from zone 3. In the instances in which the fourth operational zone is not utilized, the raffinate stream passed from zone 1 to zone 4 must be carefully monitored in order that the flow directly from zone 1 to zone 3 can be stopped when there is an appreciable quantity of raffinate material present in the raffinate stream passing from zone 1 into zone 3 so that the extract outlet stream is not contaminated.

A cyclic advancement of the input and output streams through the fixed bed of adsorbent can be accomplished by utilizing a manifold system in which the valves in the manifold are operated in a sequential manner to effect the shifting of the input and output streams, thereby allowing a flow of fluid with respect to solid adsorbent in a counter-current manner. Another mode of operation which can effect the counter-current flow of solid adsorbent with respect to fluid involves the use of a rotating disc valve in which the input and output streams are connected to the valve and the lines through which feed input, extract output, desorbent input and raffinate output streams pass are advanced in the same direction through the adsorbent bed. Both the manifold arrangement and disc valve are known in the art. Specifically, rotary disc valves which can be utilized in this operation can be found in U.S. Pat. Nos. 3,040,777 and 3,422,848. Both of the aforementioned patents disclose a rotary type connection valve in which the suitable advancement of the various input and output streams from fixed sources can be achieved without difficulty.

In many instances, one operational zone will contain a much larger quantity of adsorbent than some other operational zone. For instance, in some operations the buffer zone can contain a minor amount of adsorbent as compared to the adsorbent required for the adsorption and purification zones. It can also be seen that in instances in which desorbent is used which can easily desorb extract material from the adsorbent that a relatively small amount of adsorbent will be needed in a desorption zone as compared to the adsorbent needed in the buffer zone or adsorption zone or purification zone or all of them. Since it is not required that the adsorbent be located in a single column, the use of multiple chambers or a series of columns is within the scope of the invention.

It is not necessary that all of the input or output streams be simultaneously used, and in fact, in many instances some of the streams can be shut off while others effect an input or output of material. The apparatus which can be utilized to effect the process of this invention can also contain a series of individual beds connected by connecting conduits upon which are placed input or output taps to which the various input or outlet streams can be attached and alternatively and periodically shifted to effect continuous operation. In some instances, the connecting conduits can be connected to transfer taps which during the normal operations do not function as a conduit through which material passes into or out of the process.

It is contemplated that at least a portion of the extract output stream will pass into a separation means wherein at least a portion of the desorbent material can be separated to produce an extract product containing a reduced concentration of desorbent material. Preferably, but not necessary to the operation of the process, at least a portion of the raffinate output stream will also be passed to a separation means wherein at least a portion of the desorbent material can be separated to produce a desorbent stream which can be reused in the process and a raffinate product containing a reduced concentration of desorbent material. The separation means will typically be a fractionation column or an evaporator, the design and operation of either being well known to the separation art.

Reference can be made to D. B. Broughton U.S. Pat. No. 2,985,589, and to a paper entitled "Continuous Adsorptive Processing—A New Separation Technique" by D. B. Broughton presented at the 34th Annual Meeting of the Society of Chemical Engineers at Tokyo, Japan, on Apr. 2, 1969, for further explanation of the simulated moving-bed counter-current process flow scheme.

A dynamic testing apparatus is employed to test various adsorbents with a particular feed mixture and desorbent material to measure the adsorbent characteristics of adsorptive capacity, selectivity and exchange rate. The apparatus consists of an adsorbent chamber of approximately 70 cc volume having inlet and outlet portions at opposite ends of the chamber. The chamber is contained within a temperature control means and, in addition, pressure control equipment is used to operate the chamber at a constant predetermined pressure. Quantitative and qualitative analytical equipment such as refractometers, polarimeters and chromatographs can be attached to the outlet line of the chamber and used to detect quantitatively or determine qualitatively one or more components in the effluent stream leaving the adsorbent chamber. A pulse test, performed using this apparatus and the following general procedure, is used to determine selectivities and other data for various adsorbent systems. The adsorbent is filled to equilibrium with a particular desorbent material by passing the desorbent material through the adsorbent chamber. At a convenient time, a pulse of feed containing known concentrations of a tracer and of a particular ketose and aldose or both all diluted in desorbent is injected for a duration of several minutes. Desorbent flow is resumed, and the tracer and the ketose and aldose are eluted as in a liquid-solid chromatographic operation. The effluent can be analyzed on-stream or alternatively effluent samples can be collected periodically and later analyzed separately by analytical equipment and traces of the envelopes of corresponding component peaks developed.

From information derived from the test adsorbent, performance can be rated in terms of void volume, retention volume for an extract or a raffinate component, selectivity for one component with respect to the other, the rate of desorption of an extract component by the desorbent and the extent of silica contamination of the extract and raffinate stream. The retention volume of an extract or a raffinate component may be characterized by the distance between the center of the peak envelope of an extract or a raffinate component and the peak envelope of the tracer component or some other known reference point. It is expressed in terms of the volume in cubic centimeters of desorbent pumped during this time interval represented by the distance between the peak envelope. Selectivity, (B), for an extract component with respect to a raffinate component may be characterized by the ratio of the distance between the center of the extract component peak envelope and the tracer peak envelope (or other reference point) to the corresponding distance between the center of the raffinate component peak envelope and the tracer peak envelope. The rate of exchange of an extract component with the desorbent can generally be characterized by the width of the peak envelopes at half intensity. The narrower the peak width the faster the desorption rate.

To further evaluate promising adsorbent systems and to translate this type of data into a practical separation process requires actual testing of the best system in a continuous counter-current moving-bed or simulated moving-bed liquid-solid contacting device. The general operating principles of such a device are as described hereinabove. A specific laboratory-size apparatus utilizing these principles is described in deRosset et al U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and the raffinate and extract streams are being withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on the above-mentioned adsorbent testing apparatus and adsorbent evaluation may be found in the paper "Separation of $C_8$ Aromatics by Adsorption" by A. J. deRosset, R. W. Neuzil, D. J. Korous, and D. H. Rosback presented at the American Chemical Society, Los Angeles, Calif., Mar. 28 through Apr. 2, 1971.

Although both liquid and vapor phase operations can be used in many adsorptive separation processes, liquid-phase operation is required for this process because of the lower temperature requirements and because of the higher yields of extract product that can be obtained with liquid-phase operation over those obtained with vapor-phase operation. Adsorption conditions will include a temperature range of from about 20° C. to about 200° C. with about 20° C. to about 100° C. being more preferred and a pressure range of from about atmospheric to about 500 psig. with from about atmospheric to about 250 psig. being more preferred to insure liquid-phase. Desorption conditions will include the same range of temperatures and pressures as used for adsorption conditions.

The size of the units which can utilize the process of this invention can vary anywhere from those of pilot-plant scale (see for example our assignee's U.S. Pat. No. 3,706,812) to those of commercial scale and can range in flow rates from as little as a few cc an hour up to many thousands of gallons per hour.

The following examples are presented to illustrate the invention and are not intended to unduly restrict the scope and spirit of the claims attached hereto.

EXAMPLE I

The purpose of this example is to illustrate the method of manufacture of the adsorbent of our invention.

10.5 lbs. of commercial Y zeolite (23.8% volatile matter as measured by loss on ignition at 900° C.) was weighed out and blended with 2 lbs. of cellulose acetate (39.8% acetyl content). This blend was then admixed with 2500 cc of a 65% glacial acetic acid solution. The resulting dough, after intensive mixing, was extruded through a 0.03" die.

Four 500 cc portions of the extrudate were obtained and each was placed in a Marumerizer and marumerized to a different degree, i.e. two portions for 4 minutes, one at a setting of 475 revolutions per minute and the other at a setting of 550 revolutions per minute, and the other two portions for 7 minutes, one at a setting of 475 revolutions per minute and the other at a setting of 550 revolutions per minute. Each portion of marumerized extrudate was then dried in a dry system oven for 6 hours at 200° F. followed by 2 hours at 250° F. The material was then crushed and sized between 30-50 mesh screens.

Following are the densities measured for each portion as well as the density of a control sample prepared exactly as above except for the marumerization (spheronization) step.

|  | Piece Density |
| --- | --- |
| Unmarumerized adsorbent (control) | 1.152 |
| Marumerized @ 4 minutes |  |
| Setting 475 rev/minute | 1.185 |
| Setting 550 rev/minute | 1.224 |
| Marumerized @ 7 minutes |  |
| Setting 475 rev/minute | 1.167 |
| Setting 550 rev/minute | 1.232 |

It is apparent from the above that spheronization yields higher density adsorbent.

EXAMPLE II

The purpose of this example is to present the results of tests of that adsorbent in the above Example I spheronized for 7 minutes at a setting of 550 revolutions per minute, as well as comparative data for clay bound and un-spheronized organic polymer bound adsorbents. Each example was calcium ion exchanged in an upflow reactor by contacting the adsorbent with a calcium chloride solution at a 2 liquid hourly space velocity for 12 hours. The tests were conducted in the dynamic testing apparatus hereinbefore described to determine the performance of each such adsorbent with regard to the adsorptive separation of the individual components of an aqueous solution of a mixture of components.

The adsorbents were tested in a 70 cc coiled column maintained at a process of 55° C. and 50 psig pressure using pure water having a pH of 7.0 as the desorbent material. The sequence of operations for each test were as follows. Desorbent material was continuously run through the column containing the adsorbent at a nominal liquid hourly space velocity (LHSV) of about 1.0. At a convenient time desorbent flow was stopped, a 4.7 cc sample of 10 wt. % fructose in water was injected into the column via a sample loop and the desorbent flow was resumed. The emergent sugar was detected by means of a continuous refractometer detector and a peak envelope trace was developed. Another pulse containing 10 wt. % glucose was similarly run as was a pulse of deuterium oxide. Deuterium oxide has a different index of refraction than does water and thus deuterium oxide can be detected with the refractometer in the same way as is done for the sugars. The use of a feed pulse containing deuterium oxide therefore permits calculation of adsorbent selectivity for an extract component (fructose) with respect to water. A water sucrose solution was also injected to serve as a tracer from which the void volume of the adsorbent bed could be determined. Thus for each adsorbent tested for peak traces were developed, one for fructose, one for glucose, one for deuterium oxide and one for sucrose. The retention volume for glucose was calculated by measuring the distance from time zero or the reference point to the midpoint of the glucose peak and subtracting the distance representing the void volume of the adsorbent obtained by measuring the distance from the same reference point to the midpoint of the sucrose peak. In a similar manner retention volumes for fructose and deuterium oxide were obtained.

The selectivities of an adsorbent for fructose with respect to glucose and for fructose with respect to water are the quotients obtained by dividing the fructose retention volume by the glucose retention volume and by dividing the fructose retention by the deuterium oxide retention volume respectively. The results for these pulse tests are as follows:

| Adsorbent | Clay Based | Mixed Matrix | Marumerized Mixed Matrix |
| --- | --- | --- | --- |
| Halfwidth |  |  |  |
| Fructose | 14.0 | 13.79 | 16.1 |
| Glucose | 12.0 | 12.26 | 12.6 |
| Sucrose | 12.6 | 12.81 | 12.7 |
| $D_2O$ | 10.0 | 11.8 | 11.9 |
| Retention Volume |  |  |  |
| Fructose | 13.2 | 10.41 | 11.6 |
| Glucose | 2.4 | 1.96 | 2.5 |
| $D_2O$ | 12.6 | 12.21 | 15.7 |
| Selectivity |  |  |  |
| B (F/G) | 5.5 | 5.32 | 4.70 |
| B (F/$D_2O$) | 1.0 | 0.85 | 0.74 |

By spheronization, the retention volumes of the mixed matrix (organic polymer bound) adsorbent are increased and become substantially similar to the retention volumes of the clay based adsorbent. At the same time it was observed that the spheronized adsorbent exhibited improvement over the un-spheronized mixed matrix adsorbent with regard to resistance to dissolution. Spheronization is thus clearly beneficial and an advance in the art of adsorbent manufacture.

We claim as our invention:

1. A method for the preparation of a crystalline aluminosilicate adsorbent which comprises the steps of:
   (a) mixing together a powdered crystalline aluminosilicate, a powdered binder comprising a water permeable organic polymer and a liquid organic solvent to form a malleable mixture;
   (b) forming said malleable mixture into discrete formations;
   (c) then spheronizing said formations; and
   (d) thereafter removing said solvent from the resultant spheres to produce hard, dry spherical particles.

2. The method of claim 1 further characterized in that the forming of said malleable mixture in step (b) is effected by extrusion.

3. The method of claim 1 further characterized in that said hard dry formations of step (d) are broken into particles of desired sizes.

4. The method of claim 1 further characterized in that said water permeable organic polymer comprises a cellulose ester or cellulose nitrate.

5. The method of claim 1 further characterized in that said crystalline aluminosilicate is selected from the group consisting of X zeolites and Y zeolites.

6. The method of claim 5 further characterized in that said aluminosilicate contains cations at exchangeable cationic sites selected from the group consisting of alkali metals and alkali earth metals.

7. Speroidal adsorbent particles prepared by the method of claim 1.

* * * * *